United States Patent [19]
Andersen

[11] 3,860,904
[45] Jan. 14, 1975

[54] SEQUENCING BELT AND SEAT WARNING SYSTEM WITH VEHICLE START INHIBIT

[75] Inventor: Paul H. Andersen, Royal Oak, Mich.

[73] Assignee: Chrysler Corporation, Highland Park, Mich.

[22] Filed: July 31, 1972

[21] Appl. No.: 276,634

[52] U.S. Cl.............. 340/52 E, 340/53, 340/278, 180/82 C, 307/10 SB
[51] Int. Cl............................................ B60r 21/10
[58] Field of Search.......... 340/52 E, 52 R, 278, 53, 340/64; 307/10 SB, 232, 10 R; 180/82 C, 111; 317/134

[56] References Cited
UNITED STATES PATENTS

| 2,876,856 | 3/1959 | Greene | 180/111 |
| 3,340,523 | 9/1967 | Whitman | 307/10 SB |
| 3,399,351 | 8/1968 | Reszka | 307/232 |
| 3,449,714 | 6/1969 | Farley, Jr. | 307/10 SB |
| 3,455,410 | 7/1969 | Wilson | 340/52 |
| 3,675,036 | 7/1972 | Davies | 317/134 |
| 3,742,448 | 6/1973 | Motz | 340/52 E |

Primary Examiner—Alvin H. Waring
Attorney, Agent, or Firm—Talburtt & Baldwin

[57] ABSTRACT

A system for use in a vehicle such as an automobile wherein the sequence of sitting in the automobile and then fastening the seat belts by the occupants of the automobile controls the conductivity of the starting circuit of the vehicle. If an occupant does not fasten his seat belt after sitting in the vehicle or attempts to defeat the system by prebuckling or leaving the belt in a condition simulating belt usage, the system gives both an alarm and lamp warning when the car is in gear or attempted to be started and prevents the energization of the starter relay and thereby the starting circuit.

20 Claims, 5 Drawing Figures

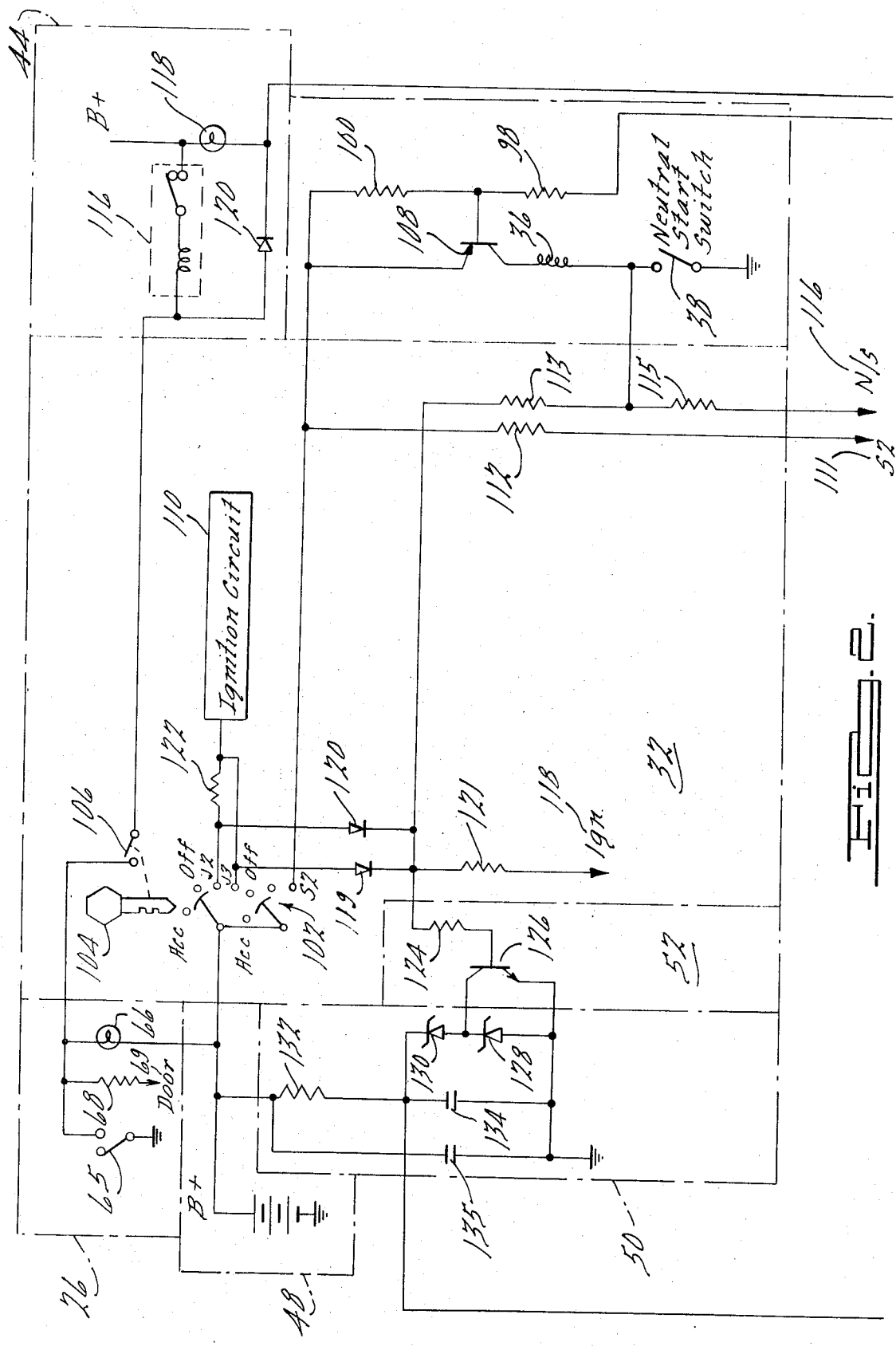

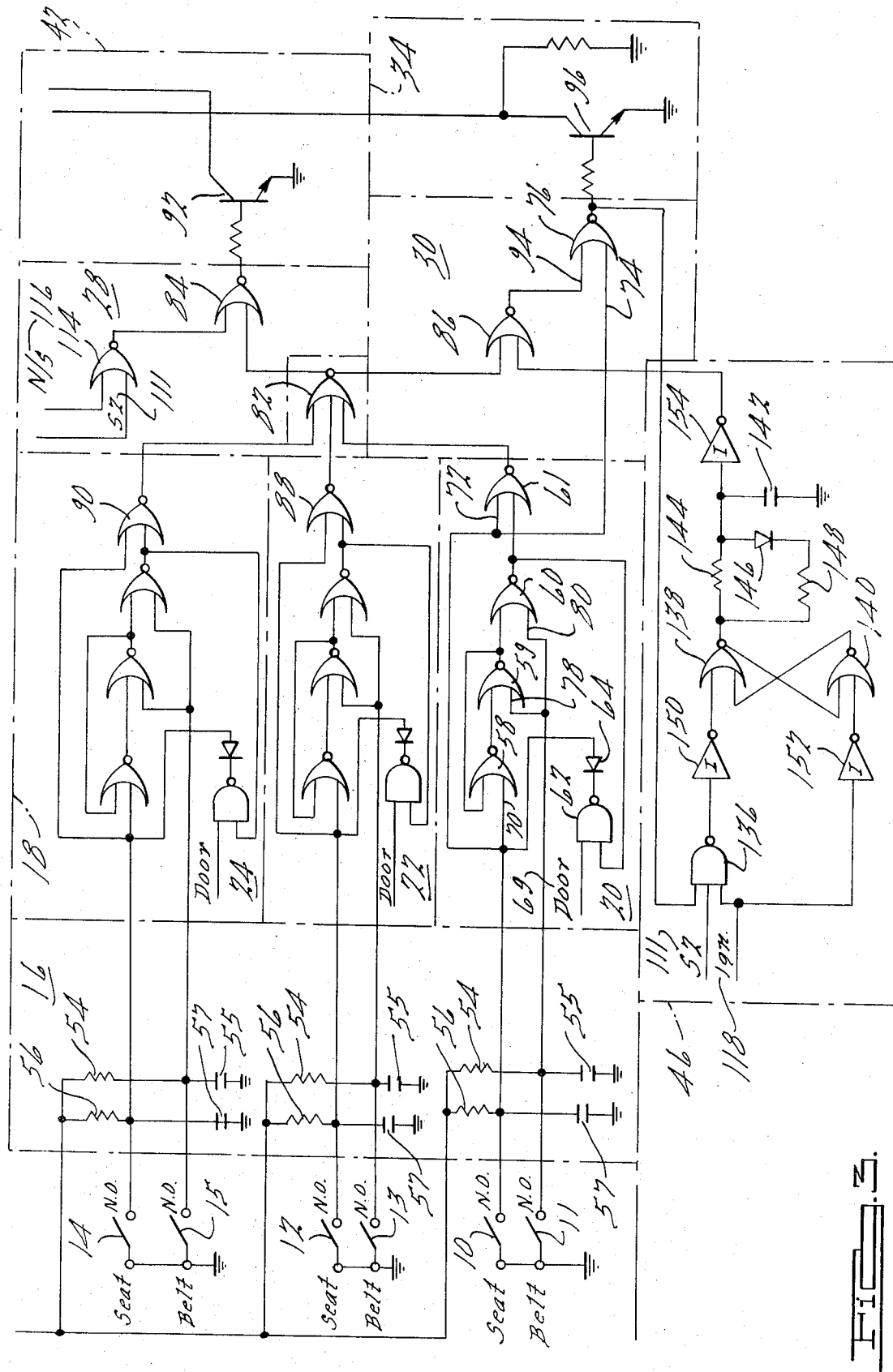

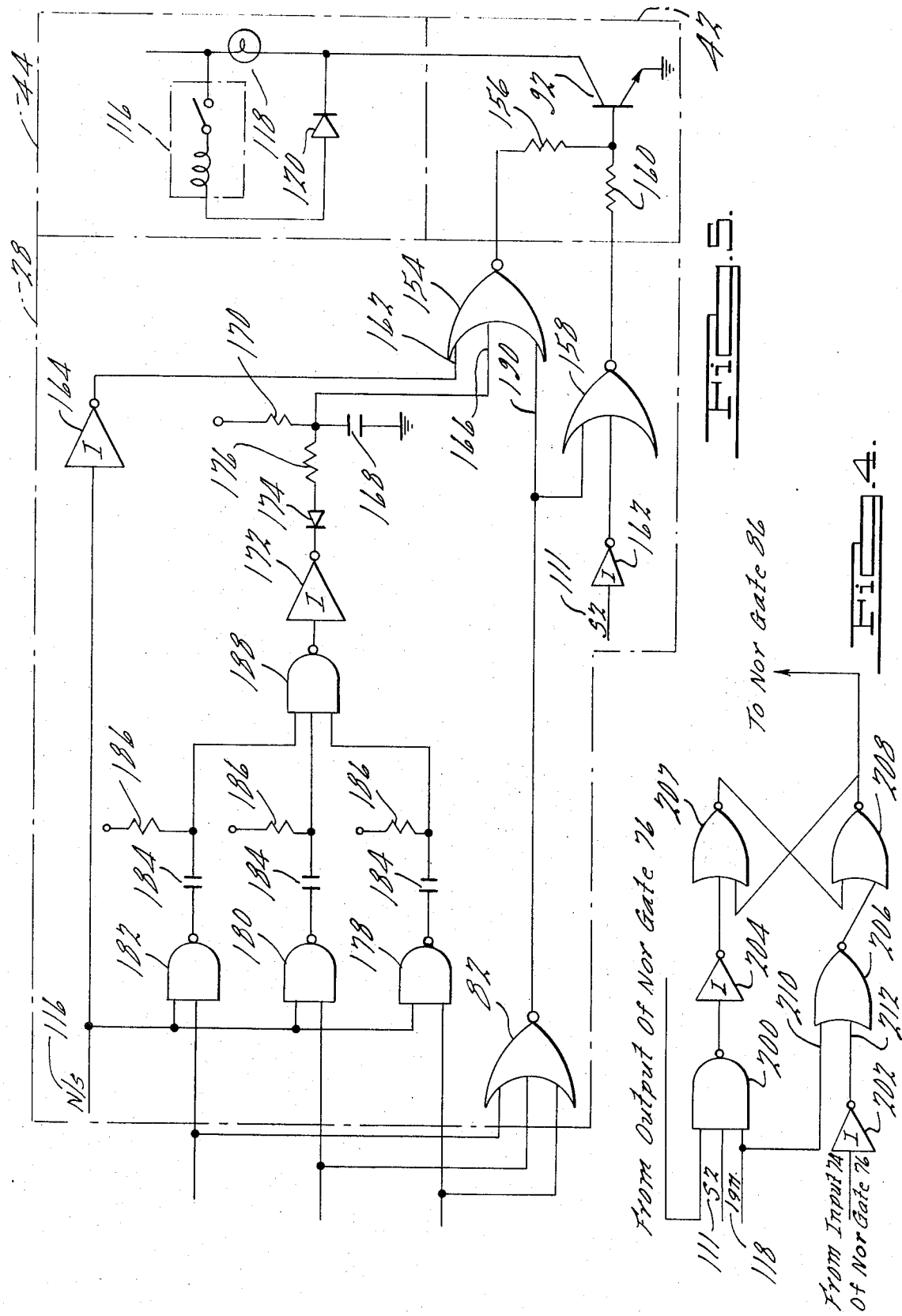

SEQUENCING BELT AND SEAT WARNING SYSTEM WITH VEHICLE START INHIBIT

CROSS-REFERENCE TO RELATED APPLICATION

Co-pending application entitled "Solid State Sequence Logic Circuit" filed on July 31, 1972 by Joseph J. Kopera, Jr. having Ser. No. 276,635 and assigned to the same assignee as this application defines the sequence logic means described herein.

BACKGROUND OF THE INVENTION

1. Field of Invention

This invention relates to seat belt warning systems in general and in particular to start inhibit circuits wherein the sequencing of sitting in a vehicle and fastening the seat belt controls starting circuit.

2. Description of Prior Art

Several prior art systems teach the control of ignition or starting circuits of vehicles through the use of switches which are responsive to several different types of vehicle devices. In particular one system, U.S. Pat. No. 2,876,856 teaches a door alarm system for inhibiting the start of the vehicle when a door is open. The main elements of the system are the ignition switch, a door switch, the starter relay which is responsive to the door switch, and the starter motor which is responsive to the relay.

Another system, U.S. Pat. No. 3,074,055, teaches series connected single-pole double-throw seat and buckle switches for controlling indicators. Under normal operation the seat switches are normally open and the buckle switches are normally closed. Therefore, if an occupant sits within a seat without buckling up the alarm is sounded and the start or ignition circuits are not affected.

Still another system, U.S. Pat. No. 3,200,370, teaches a normally closed buckle switch in series with an alarm and the ignition switch. If the belt is not fastened, the alarm goes off when the ignition switch is turned on. In this particular system this alarm circuit is an auxiliary circuit in parallel with the ignition circuit of the vehicle.

Still another system, U.S. Pat. No. 3,215,221, teaches a normally open buckle switch for the driver position which is connected in series with the parallel combination of a normally open buckle switch and a normally closed seat switch at each occupant position. The control element in this particular system is a silicon controlled rectifier which is electrically connected in series with the starter solenoid. If either the driver is not buckled up or if any of the occupied passenger positions are not buckled up, the silicon controlled rectifier is not driven into conduction to energize the starter solenoid.

Another system, U.S. Pat. No. 3,237,710, teaches a normally open buckle switch controlling a starter relay having a contact of the relay in series with the starter. Correct buckling of the buckle switch actuates the relay allowing the car to start if the ignition switch is made.

Another system, U.S. Pat. No. 3,359,539, illustrates a normally closed seat belt switch controlling a relay having a normally closed contact in series with a starter solenoid. When the ignition switch is operated, current is supplied from the battery through the normally closed relay contact to the starter solenoid only if the seat belts in each occupant position are buckled. Additionally, disclosed in that system are a plurality of positioned selection switches allowing the driver to program the occupant positions for controlling the start circuit.

Another system, U.S. Pat. No. 3,437,993, has a normally open belt switch and a normally closed seat switch controlling a relay coil having a pair of contacts in the starter relay circuit. In each occupant position both switches must be actuated in any sequence in order to prevent the relay from being energized and opening its contact.

Still another system, U.S. Pat. No. 3,449,714, has a normally closed buckle switch and a normally open seat switch electrically connected in series with the control relay. The control relay has a normally closed contact in series with the starter solenoid. As each occupant position is electrically tested for occupancy and seat belt usage, a signal is generated which controls the relay. If at any occupied position the seat belt is not fastened, the relay coil is energized opening its contact in a starter circuit thereby prohibiting the starting of the vehicle.

SUMMARY OF INVENTION

It is the principal object of this invention to provide a system for enabling the starting of a vehicle only if the occupant fastens his seat belt after sitting in the vehicle.

It is another object of this invention to allow starting of a vehicle only if a driver is properly seated and buckled up.

It is yet another object of this invention to permit restarting of a vehicle that has been stalled and the ignition switch still actuated regardless of the belted condition of each of the occupants.

It is yet another object of this invention to allow any of the occupants of the vehicle to shift their weight on the seat once the vehicle has been started and the doors are closed without interrupting the starting circuit or sounding the alarm.

It is a further object of this invention to control in response to the seat and belt condition of each occupant only the starter control circuit and not to affect the ignition control circuit.

It is still another object of this invention to provide both visual and audio alarms as a warning to the driver and the occupants whenever they are not properly secured in the vehicle.

It is still another object of this system to provide a system wherein pre-buckling of a seat belt a preactuation of a seat belt switch and then sitting either on the buckled belt or in the car will not defeat the system.

These and other objects will become apparent from the following detailed description and claims of the sequencing occupant belt and seat warning and start inhibit system for inhibiting the start of a vehicle engine until the occupant belt conditions at each occupied position are satisfied. The system as described herein is used in a vehicle having an engine, a transmission with control means for shifting the transmission, occupant seating means and electrical starting means. At each occupant seating position there is an occupant belt switch means coupled to the occupant belt in which a switch is adapted to generate an electrical signal indicating a utilization of the occupant belt. Additionally, at each occupant position there is a seat switch means which generates an electrical signal for registering the presence of an occupant seated at that position. The signals from the belt switch means and the seat switch means are supplied to a solid state sequence logic circuit for detecting the order of actuation of each of the switches. If the switches are actuated in the proper sequence, the sequence logic means generates an electrical signal indicating the proper actuation of the switches. This signal is coupled with a signal from an ignition key switch indicating that the vehicle is about to be started and with a signal from a seat switch indicating that a driver is present in the vehicle to control the energization of the starting circuit. If any of the aforementioned signals are not present, an alarm means is actuated indicating to those within the vehicle that one or more occupant positions do not satisfy the seat and belt usage requirements and the energization of the starting cirucit is inhibited.

BRIEF DESCRIPTION OF THE DRAWINGS

In the drawings:

FIGS. 2 and 3 are schematic drawings of the several sections of the system diagrammed in FIG. 1;

FIG. 4 is a modification of the restart timer illustrated in FIG. 3;

FIG. 5 is a schematic of additional circuitry for controlling the operation of the alarm means in the system of FIG. 1.

DETAILED DESCRIPTION

Figure 1:
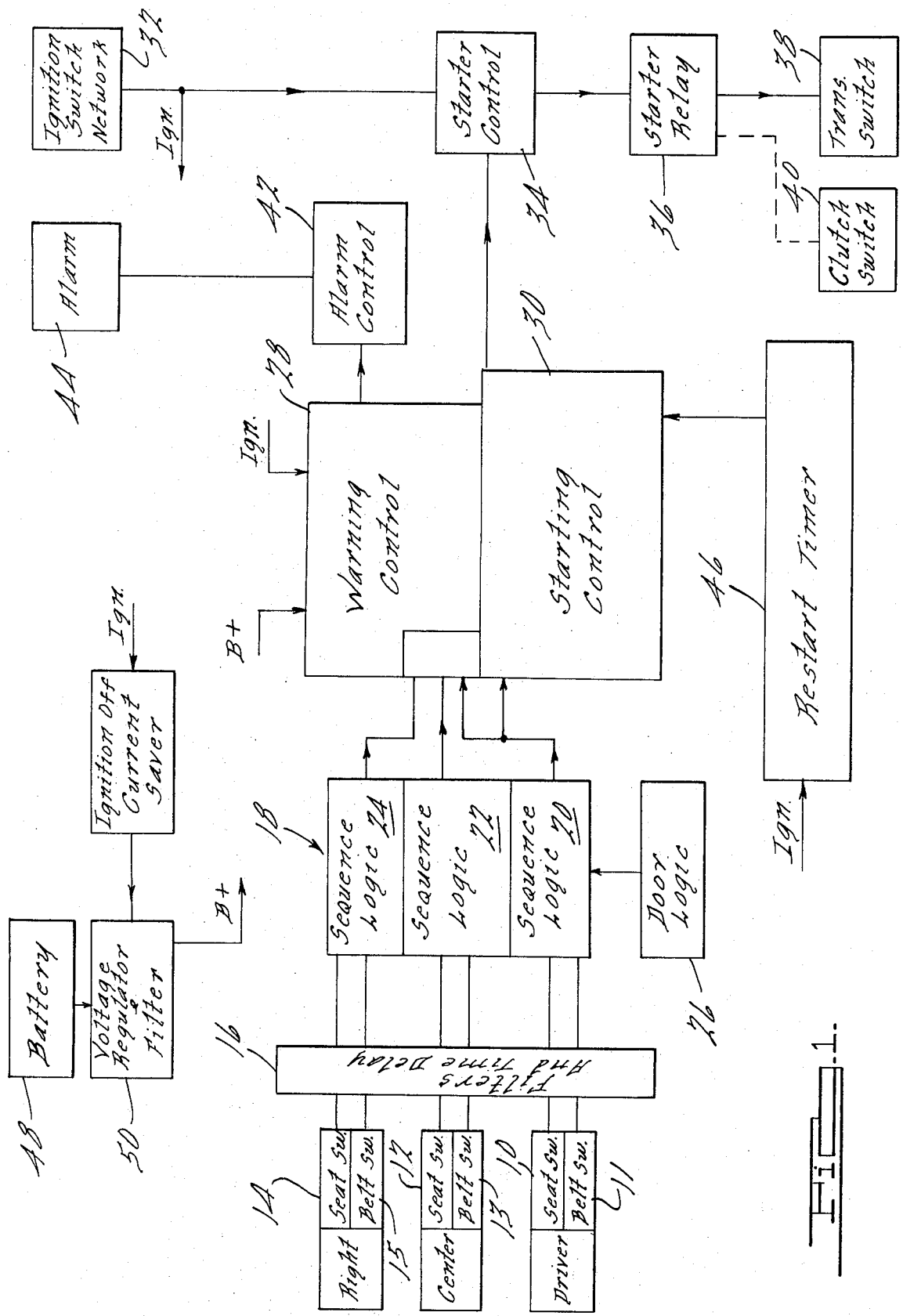
FIG. 1 is a block diagrammatic schematic of the system.

Referring to the Figures by the characters of reference, there is illustrated in FIG. 1 a block diagrammatic form of the sequencing occupant safety belt warning and start inhibit system to be described herein. As will hereinafter become apparent, an occupant safety belt or belt may be either or both a seat or lap belt which typically fastens around an individual waist or a shoulder belt or harness. FIG. 1 illustrates the interrelationships between the source of power, the several control sections, the alarm and starter circuits.

The fundamental concept of the system of FIG. 1 is to enforce selected occupants of a motor vehicle to utilize their occupant belts. In the present embodiment, the selected occupants are only those who occupy the front seat of the vehicle although the system of FIG. 1 could be extended to be applied to any occupant and any seating position in the vehicle. As illustrated in FIG. 1, at each occupant position in the front seat of the vehicle which are identified as the driver, center and right positions, there is located at least two switch means. In the driver's position there is a driver seat switch 10 and a driver belt switch 11. Likewise in the center position there is center seat switch 12, center belt switch 13 and in a similar manner in the right passenger position there is a right seat switch 14 and a right belt switch 15. As will hereinafter be illustrated, it is the sequence of actuation, the seat switch first and then the belt switch, of each one of the pair of switches at each occupant position which enforces the utilization of belts.

Each of the pair of switches in each one of the occupant positions is connected to a filter and timing network 16. The filter function of the filter and timing network 16 is to remove or filter out any unwanted electrical noise induced on the wiring to each of the switches 10–15. The timing function of the filter timing network 16 desensitizes the seat switch in each of the occupant positions thereby allowing the occupant more freedom of movement within his seat.

The output of the filter and timing network 16 is supplied to the sequence logic means 18 which in the present embodiment comprises three sequence logic sections 20, 22 and 24. The number of sequece logic sections is determined by the number of occupant positions which are being sensed. Sequence logic section 20 responds to the driver's seat switch 10 and belt switch 11 for determining whether said seat and belt switches were actuated in their predetermined sequence. Likewise sequence logic section 22 performs the same function for the center seat switch 12 and belt switch 13 and in a similar manner sequence logic section 24 responds to seat switch 14 and belt switch 15 of the right-hand seat position.

Operatively connected to the sequence logic means 18 is a door logic means 26. The function of the door logic means 26 is to indicate when any of the selected doors are open. Additionally the door logic means supply signals to the sequence logic means 18 to further desensitize said logic means 18 allowing each occupant more freedom of movement within his seat position provided the belt switch indicates that the belt is fastened.

The output of the sequence logic means 18 is supplied to the warning control means 28 and the starting control means 30. The starting control means receives inputs from the sequence logic means 18 and in response thereto controls the operation of the starter control 34. If any of the signals from the sequence logic means 18 indicate that the predetermined actuation sequence of the switches at any of the seat and belt positions was violated, the starting control means 30 will render the starter control 34 inoperative.

The starter control 34 is responsive not only to the starting control 30 but also the ignition switch means 32 for controlling the starter relay 36. The ignition switch means 32 is responsive to an attempt to start the vehicle by the presence and actuation of an ignition key. The starter relay operatively connects the starter motor to the source of power for starting the vehicle engine. Additionally, the starter relay is controlled by a transmission switch means 38 indicating the operative position of the transmission of the vehicle and if the vehicle has a manual clutch mechanism, the transmission switch may be omitted and the operation of the clutch mechanism is indicated by the clutch switch 40.

The warning control means 28 is responsive to the sequence logic means 18 and the ignition switch 32 to control an alarm control circuit comprising an alarm control 42 and alarm means 44. As will be hereinafter indicated, the warning control system 28 responds to violation of the sequence determined by the sequence control means 18 with the presence of a signal from the ignition switch 32 when the transmission is engaged or in a moving gear position as indicated by the transmission switch 38 or clutch switch 40 or when an attempt is made to start the vehicle.

To allow vehicles to be restarted after stalling there is provided a restart timing network 46 for supplying a controlled restart signal to a starting control network 30. The function of the restart timer 46 is two-fold; first, allowing the vehicle to be restarted once it has been started and the ignition key has not been turned to the off position retardless of seat belt usage; and second, allowing the restarting of the vehicle for a period of time, approximately three minutes commencing immediately after the ignition switch is turned off once the vehicle has been previously started.

Also illustrated in FIG. 1 is a block schematic of the power supply system of the vehicle, namely the battery 48 supplying DC voltage to a voltage regulator 50 which in turn supplies a regulated voltage B+ which is a value somewhat less than the battery voltage. Operatively connected to the voltage regulator is an ignition-off current-saver unit 52 which reduces or eliminates the current flow through the voltage regulator 50 whenever the ignition of the vehicle is off. This prevents battery discharge while the vehicle is not being operated but still provides filtering of voltage transients and power for operating the sequence circuitry.

FIGS. 2 and 3 illustrate in schematic form the system of FIG. 1. In the preferred embodiment, the logic illustrated in FIGS. 2 and 3, with the exception of the battery, the lamps and some of the switches, is formed of solid state devices in. In the logic circuits of the sequence logic 18 starting control 30, the warning control 28 and the restart timer are comprised of NAND and NOR gates. In the preferred embodiment all the seat switches 10, 12 and 14 are normally open switches and are responsive to a predetermined amount of weight resting thereon in order to be actuated to the closed position. However, other forms of seat switch means responsive to a physical parameter of an individual manifesting the presence of an occupant may also be used as long as the signal output from the means differentiates between the presence and absence of an occupant. The occupant belt switches 11, 13 and 15 are likewise normally open switches which are actuated and closed whenever the belt is fastened or a predetermined tension is placed on the belt. The movable contact of each of these switches 10-15 is electrically connected to ground and the normally open contact is electrically connected in circuit to the junction of a corresponding resistor and capacitor pair in the filter network.

For the purpose of the logic of this system, the voltage will be referred to as "high" or "low" depending upon the logic value. A low voltage signal is a signal that is approximately at ground potential. A high voltage signal is a signal which is at some voltage approximating the regulated voltage of the system. Thus with the combination of two voltage levels, the respective binary values of zero and one are obtained. The logical function of a NAND gate is that whenever any input signal is low the output signal is high. And in a similar manner the logical function of any NOR gate is such that whenever any input signal is high the output of the gate is low.

In the filter and timing network 16 the resistor 54 and capacitor 55 network for each of the belt switches 11, 13 and 15 has a much shorter time constant than does the resistor 56 and capacitor 57 network for each of the seat switches 10, 12 and 14. The capacitance electrically connected to the seat switches comprising two capacitors electrically connected in parallel is greater than the capacitance electrically connected to the belt switch thereby allowing an occupant to shift his weight in his seat without interrupting the signal from his seat switch means. When any of the switches are closed, the resulting signal at the junction of the resistor and the capacitor is at a low voltage level and when a switch is opened the capacitor 55 or 57 charges to the high voltage level through its respective resistor 54 or 56.

The output of each of the switches 10-15 from the filter network 16 is supplied to the sequence logic network 18 and particularly the outputs from each of the switches 10 and 11 are supplied to the sequencing network 20. For the purpose of explanation, sequencing network 20 will be explained as referred to the driver's position inasmuch as each of the other sequence logic networks 22 and 24 are substantially identical in construction and function. The same explanation will thereby be applicable thereto. For a more detailed explanation of the sequence logic networks see the above co-pending application entitled "Solid State Sequence Logic Circuit" filed by Joseph J. Kopera, Jr. and assigned to the same assignee.

Each sequence logic network such as network 20 is comprised of four NOR gates 58-61, a NAND gate 62 and a diode 64. The function of the NAND gate 62 and the diode 64 is to prevent actuation of the alarm means 44 if a seat switch 10, 12 or 14 is inadvertently opened due to the occupant shifting on the seat when reaching for change, etc. The NAND gate in the preferred embodiment is a two input gate where one input comes from the door logic 26 and the other input indicates that the sequence has been satisfied. The output of the NAND gate 62 is diode coupled to the input of the sequence logic from the seat switch. This NAND gate 62, once the proper sequence of seat belt fastening and sitting in the vehicle has been satisfied, electrically clamps the output of the seat switch 10 to the low voltage level at the output of the NAND gate 62 through the diode 64.

The door logic as illustrated in FIG. 2 comprises a door switch 65, which is normally open when the door is closed, electrically connected in series with a dome light 66 to the battery 48. When the door is open the switch 65 closes lighting the dome light 66 and generating an electrical signal "door" 69 from the resistor 68 to one input of the NAND gate 62.

In the normal state with no occupant and the door opened or closed, the output of each of the NOR gates 58, 59, 60 and 61 is low and the output of the NAND gate 62 is high. Likewise if no one is sitting on the seat, the driver's seat for the purpose of illustration, and the seat belt is unfastened the output signal on both the seat switch 10 and the belt switch 11 is high. When the door is opened, the door signal goes low, however, the output of the NAND gate 62 remains high. When an individual occupies the driver's seat, the switch 10 closes thereby presenting a low signal to the one input 70 of gate 58, the one input 72 of gate 61, and the one input 74 of gate 76. This last connection, namely, to the one input 74 of gate 76 is not present in any of the other sequence logic networks for the other seat positions but it is required in order for the vehicle to be started. This enforces one object of the invention in that the driver must be physically present on the seat of the vehicle before the vehicle may be started.

When the individual sits down, the low signal from the seat switch 10 is applied to the one input 72 of the gate 61 driving the output to a high condition. As will hereinafter be shown, a high signal at the output of this gate indicates an error condition. In the present sequence of events there being only a driver sitting in the vehicle without his belt fastened, there is a detected error condition. Likewise the output of the gate 58 is driven from a low condition to a high condition.

As soon as the driver buckles his belt an electrical signal is generated by actuation of the switch 11, which as previously mentioned, may be a buckle switch or a belt tension switch or any similar switch indicating the utilization of a belt. This signal drives the one input 78 of the gate 59 and the one input 80 of the gate 60 from a high to a low condition. The output of the gate 59 is not changed, however, the output of the gate 60 goes from a low to a high condition, thereby, affecting the output of the gate 61 driving it low. The low output from the gate 61 indicates no error inasmuch as preferred sequence of operation is for an individual to sit on the seat actuating his seat switch and then place the seat belt around himself actuating the seat belt switch. By forcing this sequence, the occupant is discouraged from fastening his belt and sitting on the fastened belt or fastening the belt behind him after sitting in the vehicle.

The output of the gate 60 as previously indicated is supplied to the other input of the NAND gate 62. Inasmuch as this output is now high and the door is closed developing a high signal at the door resistor 68, the output of the NAND gate 62 is low. With this output low and due to the direction of conduction of the diode 64 the one input 70 of the gate 58 is clamped to the low output of the NAND gate 62. Therefore, unless the occupant removes his seat belt any shifting of his weight in his seat causing the seat switch to open momentarily will not affect the sequence logic network 20.

The output signals from each of the sequencing networks 20, 22 and 24 are electrically gathered at the NOR gate 82. If any of the sequence logic networks 20, 22 and 24 indicate that there is an error this will place a high signal on the corresponding input line to the gate 82 driving its output low. If all occupant positions are properly conditioned as determined by the sequence logic means 18, the normal output of the gate 82 is high.

The NOR gate 82 is common to both the warning control means 28 and the starting control means 30. The output of the gate 82 is supplied to one input of the NOR gate 84 in the warning control 28 and to one input of the NOR gate 86 in the starting control 30. With the driver sitting in the vehicle with his belt properly fastened, the output of the NOR gate 61 is low and with no other occupants the output of the corresponding NOR gates 88 and 90 in the sequence logic networks 22 and 24 are likewise low. Therefore, with all low signals at the input to the NOR gate 82 the output is high indicating a correct or non-error condition. With the high output from the NOR gate 82 applied to the input of the NOR gate 84, the resulting low output is applied to the base of the transistor 92 in the alarm control network 42 causing the transistor 92 to be nonconductive. In a similar manner, the output of the NOR gate 86 is likewise low and is applied to the other input 94 of the gate 76. Since the driver is on his seat, the one input 74 of the gate 76 is low and therefore with both inputs low, the output of the gate is high. This high signal biases the transistor 96 in the starter control network 34 into conduction drawing current through the resistors 98 and 100.

The ignition switch 102, illustrated in FIG. 2, is a two level switch having a movable contact and four switch positions on each level. By reading each level of the switch in a clockwise position, the four positions of an ignition switch are identified as follows: Accessory, Off, J2, and J3 on the first level and S2 on the second level. The J2 position is more commonly referred to as the Run position and the J3 or S2 position as the Start position. The switch is constructed as a make-beforebreak switch so that it will make the next succeeding contact before breaking the contact that it is on. In order for the transistor 96 to conduct, the movable arm of switch 102 must couple the output of the battery 48 through the switch position S2 to resistor 100. With the transistor 96 biased for conduction as previously indicated, the voltage drop across the resistor 100 biases the power transistor 108 into conduction to energize the starter relay 36. If the vehicle has an automatic transmission, the transmission must be in a neutral position such as neutral or start, for starting which is indicated by the switch 38 being closed. This provides a path for full conduction of the transistor 108 and the energization of the starter relay 36. If the vehicle has a manual transmission, the clutch switch 40 will functionally replace the neutral-start switch 38.

Additionally at this time, a logic signal S2 111 is generated through the resistor 112 and is applied to one input of the NOR gate 114 in the warning control means 28. The neutral start switch 38 supplied ground at the junction of the resistors 113 and 115 to generate the N/S signal 116 which is applied to another input of the NOR gate 114. The function of the NOR gate 114 is to control the warning circuit thereby allowing the buzzer to operate only when the car is running and in gear, N/S signal 116 high, or when an attempt is made to start the car and the S2 signal 111 is high. The output of the NOR gate 114 is low whenever it is desired to have the warning control means operate.

When the ignition switch 102 is actuated by a key 104, an ignition key presence switch 106 is also actuated to indicate the presence of the ignition key. This switch 106 electrically connects a buzzer 116 in the alarm means 44 with the door switch 65 to sound the buzzer when the vehicle door is open and the key is in the ignition. A lamp 118, also in the alarm means 44, is prevented from operating under those conditions by the diode 120, however, when the alarm control transistor 92 is in conduction both the buzzer 116 and the lamp 118 are actuated through the transistor 92.

In the ignition switch means 32 there is generated the ignition signal IGN 118. This signal is generated from either the J2 or J3 positions of the ignition switch 102 that are coupled by means of the isolation diodes 119 and 120 to the resistor 121. The J3 position on the ignition switch 102 is a direct electrical connection from the battery 48 to the ignition circuit 110 and the J2 position is electrically connected through the ballast resistor 122 to the ignition circuit 110. Since the IGN signal 118 represents the switch in either of the two positions it is necessary to electrically isolate the two switch positions by the two isolation diodes 119 and 120. Additionally, the output of these two diodes 119 and 120 is supplied to the neutral/start resistance network 113 and 115 and also to the current-saver unit 52.

The current-saver unit 52 in the present embodiment comprises a base resistor 124 and a transistor 126. With the ignition switch 102 in either the J2 or J3 position, voltage is supplied from the battery to the resistor 124 biasing the transistor 126 into conduction. The emitter-collector circuit of the transistor 126 is electrically connected to the voltage regulator 50 and in particular in parallel with a zener diode 128.

The voltage regulator circuit 50 comprises a first and second zener diode 128 and 130 electrically connected in series with a resistor 132 between ground and the battery 48. A pair of capacitors 134 and 135 are electrically connected in the voltage regulator circuit to protect the circuit components from voltage transients. When the transistor 126 is in conduction, the first zener diode 128 is electrically by-passed or shunted and the voltage output of the regulator circuit is equivalent to the zener voltage of the second zener diode 130 which in the preferred embodiment is 8.2 volts. When the ignition switch 102 is off, the transistor 126 is biased off and the regulated voltage from the output of the voltage regulator circuit is the sum of the two zener voltages which in the preferred embodiment is 13.8 volts or the battery voltage whichever is lower. The voltage sum of the two zener diodes is typically greater than the voltage output of the battery 48, therefore, when the ignition is off, zener current is not drawn through the voltage regulator discharging the battery.

The purpose of the current saver unit 52 and the voltage regulator circuit 50 is to protect the solid state circuitry of the warning control means 28, the starting control means 30, the restart timing circuit 46 and the other units from voltage transients. When the ignition is off, the voltage regulation of the zener diodes 128 and 130 is a voltage level which is typically greater than the battery voltage and therefore will regulate only on voltage transients exceeding the zener voltage. At this time when the ignition is off there is not any current drain from the battery through the zener diodes.

When the ignition switch 102 is moved to either J2 or the J3 position, the transistor 126 is driven in conduction and the voltage regulator effectively suppresses the voltage transients due to starting and running of the engine at a voltage substantially equal to the zener voltage of the diode 130. During running of the engine, the diode 130 suppresses any voltage transients due to charging current and any to electrical load fluctuations.

The restart timing circuit 46 comprises an input NAND gate 136, a flip flop comprising a pair of cross-coupled NOR gates 138 and 140, and a timing circuit comprising a capacitor 142, a first resistor 144 and a series circuit comprising a diode 146 and a second resistor 148 electrically connected in parallel with the first resistor 144. The input NAND gate 136 is a three input gate wherein the first input is connected to the ignition signal IGN 118, the second input is connected to the S2 signal 111 and the third input is connected to the output of the NOR gate 76 in the starting control means 30. When the vehicle is running, the IGN signal 118 and the output signal from the NOR gate 76 are high and the S2 signal 111 is low, therefore, the output of the NAND gate 136 is high. This output is inverted by an inverter 150 and supplied to one input of the NOR gate 138. The ignition signal IGN 118 is also applied through an inverter 152 to one input of the NOR gate 140.

In the initial condition of the restart circuit 46, during starting, all the inputs to the NAND gate 136 are high and the resulting output is low. This low output is applied through the inverter 150 to one input of the NOR gate 138. Because of the inverter the one input is high and the output of the NOR gate 138 is low. In a similar manner, the IGN signal 118 is applied through the inverter 152 to one input of the NOR gate 140. Since the output of the first NOR gate 138 is cross-coupled to the second input of the NOR gate 140 and both inputs are low, the output of the NOR gate 140 is high. The low output signal from the NOR gate 138 is applied through the first resistor 144 to the input of the inverter 154 developing a high output signal therefrom. This high output signal is applied to the NOR gate 86 in the start control means 30.

When the vehicle is running, the output of the NOR gate 76 is high and the S2 signal 111 is low, therefore the output of the NAND 136 is driven high. This high is coupled through the inverter 150 to the one input of the NOR gate 138. However, since the other input is high, the output of the NOR gate 138 remains low, therefore, the output of the inverter 154 is high. If the vehicle should stall, the high output from the inverter 154 through the NOR gate 86 will maintain the output of the NOR gate 76 high as long as the driver is in the vehicle. This permits the car to be restarted regardless of the belted condition of any of the occupants of the vehicle as represented by the output of the NOR gate 82. However, if the ignition switch is turned off, the ignition signal 118 goes low causing a high signal to be applied to the one input of the NOR gate 140 through the inverter 152. This high signal will switch the output of the NOr gate 140 to low which when applied to the other input of the NOR gate 138 will switch its output high. The high voltage signal at the output of the NOR gate 138 causes the capacitor 142 to charge through the first resistor 144. In the preferred embodiment, the charging time is approximately 2 to 3 minutes. During the charging time of the capacitor, the output of the inverter 154 remains high until the capacitor is sufficiently charged to a voltage level to overcome the switching level of the inverter. When the capacitor is substantially charged the output of the inverter switches from a high to a low thereby preventing the start control means 30 from allowing restart unless and until the seating and belting conditions of all occupied positions are satisfied. When the vehicle is to be restarted after the ignition switch has been turned on or when the vehicle is initially started, the output of the NOR gate 138 is driven low and the capacitor 142 quickly discharges through the diode 146 and the second resistor 148. This time constant is very fast allowing the output of the inverter 154 to go high.

As illustrated, the function of the restart circuit is to allow the vehicle to be restarted at any time as long as the ignition switch has not been turned off and regardless of the seated and belted conditions of the occupants. This is in case the vehicle has stalled or in some manner the engine has ceased to run without turning the ignition key off. However, if the ignition key is turned off, the operator has a time period of approximately 2 to 3 minutes in which to restart the vehicle without resatisfying the seated and belted condition of all the occupant positions.

Referring to FIG. 4, there is illustrated a modification of the restart timer replacing the restart timer 46 illustrated in FIG. 3. In this modification, the vehicle can be restarted at any time when the ignition is on or the vehicle driver is in his seat. This modification removes the time delay portion of the reset timer in FIG. 3 and allows only that amount of delay restart time which is afforded by the filter network comprising the resistor 56 and the capacitor 57 electrically connected to the driver's seat switch.

In FIG. 4, the restart timer comprises three-input NAND gate 200, a pair of inverters 202 and 204 and three two input NOR gates 206-208 wherein two of the NOR gates 207 and 208 are cross-coupled in the form of a flip flop. The output of the restart timer is electrically connected from the output of one of the flip flop gates 208 to one of the inputs of NOR gate 86 in the start control means 30. The inputs to the NAND gate 200 are identical to the inputs to the NAND gate 136 of FIG. 3. The inverter 204 functions the same as the inverter 150 and the flip flop comprising NOR gates 207 and 208 functions the same as the corresponding NOR gates 138 and 140.

The main logic difference is in the reset circuitry of the NOR gate 208. The IGN signal 118 is directly connected to one input 210 of the two input NOR gate 206 and the other input 212 is directly connected through the inverter 202 to the input 74 of the NOR gate 76 thereby coupling the output of driver's seat switch 10 to the restart timer. This NOR gate 206 provides the control to reset the flip flop whenever the ignition is turned off and the driver has left his seat. Initially the flip flop was set when the proper sequence was followed and the vehicle was started. With this modification the vehicle may be restarted for any period of time as long as the ignition is not turned off and the driver has not left his seat regardless of the seated and belted conditions of the occupants.

Referring to FIG. 5, there is illustrated a modification of the warning control means 28. Also included in FIG. 5 are the alarm means 44 and the alarm control 42, both of which are identical to the means in FIGS. 2 and 3. The purpose of the modification in FIG. 5 is to provide actuation of the alarm means for a finite period of time when the vehicle is in the running mode. The running mode signal conditions are gathered at the NOR gate 154 and are supplied by resistor 156 to the base of the alarm control transistor 92. The warning control signals when the automobile is in the start mode are gathered by the NOR circuit 158 and are supplied to the base of the transistor 92 through the resistor 160.

In the system of FIG. 1, including the modification illustrated in FIG. 4, the alarm means 44 is actuated when the vehicle is attempted to be started and the seat and belt sequence has been violated. In FIG. 5, the NOR gate 82 supplies the signals indicating whether or not the seat and belt sequence has been violated. If there is a violation, the output of NOR gate 82 is low which is supplied to the first input of the NOR gate 158. The second input of the NOR gate 158 is energized by the start signal S2 111 supplied through the inverter 162. When an attempt is made to start the vehicle, the signal S2 111 is high and due to the inverter 162, the second input of the NOR gate 158 is low. If there is a violation in the sequence, the first input is also low and the output of the NOR gate 158 is high. The high signal is supplied to the resistor 160 biasing the transistor 92 causing the alarm and lamp to actuate. This condition remains until either the ignition switch is removed from the S2 position or the violation is corrected.

If the vehicle is in the running mode which is controlled or indicated by a high N/S signal 116, the modification of FIG. 5 provides the means for actuating the alarm means 44 for a finite period of time. In the preferred embodiment this period of time is approximately one minute. As previously indicated, the NOR gate 154 has three inputs for the three conditions for controlling the actuation of the alarm means 44 in the running mode. The first input 162 is supplied from an inverter 164 and is responsive to the N/S signal 116, therefore, a low signal at the input 162 indicates that the car is in gear.

The second input 166 of the NOR gate 154 supplies the actual time control signal for the gate. Normally the signal on this input is high inasmuch as the capacitor 168 is charged through the resistor 170 to the regulator voltage. As will hereinafter be shown, the output of the inverter 172 is normally high back-biasing the diode 174 thereby opening the electrical discharge path of the capacitor 168 through the resistor 176. When the output of the inverter is switched low the capacitor 168 discharges through the resistor 176 and the forward biased diode 174 switching the input signal at the second input 166 of the NOR gate 154 to low.

The logic control circuit for the inverter 172 comprises three two-input NAND gates 178, 180 and 182 which have a first input respectively connected to the sequence logic circuits 20, 22 and 24. The second input of each of the NAND gates is collectively connected to the N/S signal 116. The normal condition of the inputs to each of these gates when the vehicle is running is that the N/S signal 116 is high and the output of each of the sequence logic networks is low. This produces a high output from each of the gates. Electrically connected to the output of each of the gates 178, 180 and 182 is a small RC timing network comprising like capacitors 184 and resistors 186 electrically connected to the voltage source. When the output of each of the NAND gates is high, the junction point between the respective resistor 186 and capacitor 184 is also high. Each of these outputs are supplied to one of three inputs of a NAND gate 188 producing a low output therefrom. This output is electrically connected to the inverter 172 producing the high output as previously mentioned.

During the running mode of the vehicle, the N/S signal 116 is high and if there is a violation of any of the seat and belt positions, the output from the corresponding sequence logic networks 20, 22 or 24 is high. The two high signals applied to the input of any of the NAND gates 178, 180, 182 produces a low output signal from that gate. This low output signal causes the capacitor 184 to discharge placing a low pulse on the corresponding input to the NAND gate 188. This low input will cause the output to switch to a high signal which is inverted at the output of the inverter 172. As previously indicated, when this output is low, the capacitor 168 discharges. Due to the time constant of the resistor capacitor network 186-184, the input to the NAND gate 188 is a pulse. Therefore, once the violation has been noted, and nothing has been done to correct it, the alarm means 44 will be actuated until the capacitor 168 is charged to the resistor 170.

The signal on the third input 190 of the gate 154 is responsive to the violation of the seat and belt sequencing logic 18. When all of these three inputs to the gate 154 are low, the buzzer will be actuated. However, the buzzer will be turned off if the car is moved out of gear as represented by a high signal at the first input 162 or at the conclusion of the time constant of the resistor-capacitor network 168–170 at the second input 166 or when the violation has been corrected as indicated by the sequence logic means supplied to the third input 190. However, the NOR gate 158, as previously indicated, will maintain the actuation of the alarm means 44 as long as there is a violation of the seat and belt sequence logic means 18 when the car is in a neutral-start position.

The logic circuitry comprising the sequence logic means 18, the warning control means 28, the starting control means and the restart timing network in the preferred embodiment are all fabricated by integrated circuitry techniques. This method of fabrication permits a small compact "control center" for the system which may be placed at any convenient location within the vehicle. At the present time, most of the other electronic components are discrete components due to their electrical size and/or heat dissipation. However, any and all parts of the system may be either discrete components of fabricated according to the latest electronic chip techniques. In addition it is understood that by proper conversion the NOR logic and NAND logic described herein may be connected to NAND and NOR logic respectively.

There has thus been shown and described a sequence belt and seat warning system with vehicle start inhibit for use in automobiles. The vehicle is inhibited from starting until all occupants are properly seated and their seat belts are fastened about them. The sequence of an occupant sitting in a vehicle and then fastening his belt controls the logic of the system.

What is claimed is:

1. In a motor vehicle having an engine, transmission, and occupant seating means and a safety belt at each of a predetermined number of occupant positions of said seating means, a sequencing safety belt warning and start inhibit system for inhibiting the start of the vehicle engine unless usage of the safety belt at each occupied position of said predetermined number of occupant positions is indicated to have occurred subsequent to occupancy thereof, said system comprising:

safety belt switch means operatively associated with the safety belt at each one of the predetermined occupant positions for generating and maintaining a first electrical signal registering utilization of the safety belt;

seat switch means at each one of the predetermined occupant positions for generating and maintaining a second electrical signal registering the presence of an occupant occupying the corresponding position;

sequence logic means electrically connected in circuit for receiving said first and second electrical signals at each predetermined occupant position, said sequence logic means means including means for detecting the sequence of generation of said first and second electrical signals at each predetermined occupant position and for generating a third electrical signal whenever the second signal alone is generated at any of said predetermined occupant positions and whenever generation of the first signal precedes the generation of the second signal at any of said predetermined occupant positions;

ignition key switch means responsive to an attempt to start the vehicle for generating a fourth electrical signal;

alarm means responsive to said third signal from said sequence logic means and said fourth signal from said ignition key switch means for alarming a vehicle occupant; and engine start control means responsive to said third electrical signal from said sequence logic means and said fourth electrical signal from ignition key switch means for inhibiting the start of the vehicle engine.

2. In the sequencing safety belt warning and start inhibit system according to claim 1 wherein each of said safety belt switch means is normally in a non-conducting state and is actuated to a conducting state for generating said first electrical signal whenever the associated safety belt is extended a predetermined distance from its normal position.

3. In the sequencing safety belt warning and start inhibit system according to claim 2 wherein each of said safety belt switch means is a normally open switch.

4. In the sequencing safety belt warning and start inhibit system according to claim 1 wherein each of said safety belt switch means is normally in a non-conducting state and is actuated to a conducting state for generating said first electrical signal whenever the free ends of the associated safety belt are buckled relative to one another thereby forming a closed loop.

5. In the sequencing safety belt warning and start inhibit system according to claim 1 wherein each of said seat switch means is normally in a non-conducting state and is actuated to a conducting state for generating said second electrical signal in response to a physical parameter manifesting the presence of an occupant in the vehicle occupying the corresponding occupant position.

6. In the sequencing safety belt warning and start inhibit system according to claim 5 wherein each of said seat switch means is a normally open switch responsive to at least a predetermined weight acting thereon for generating said second electrical signal.

7. In the sequence safety belt warning and start inhibit system according to claim 1 wherein said ignition key switch means is operable to an off position and additionally including a restart timing system connected to said engine start control means and to said ignition key switch means and operable after the vehicle has been started for overriding said sequence logic means for a predetermined time after said ignition key switch means has been operated to the off position whereby to permit restarting of the vehicle within said predetermined time without requiring the occupants of any of said predetermined occupant positions to unbelt and then rebelt their safety belts.

8. In the sequencing safety belt warning and start inhibit system according to claim 7 wherein said key ignition switch means is also operable to a run position and said restart timing system additionally includes means operable after the vehicle has been started for overriding said sequence logic means so long as said ignition key switch remains in the run position.

9. In the sequencing safety belt warning and start inhibit system according to claim 1 wherein the vehicle includes a door and additionally including door switch means responsive to the opening of the vehicle door for generating a fifth electrical signal and a key sensing switch for generating a sixth electrical signal when a key is present in said ignition key switch means and wherein said alarm means comprises a lamp responsive to said third and fourth electrical signals and a buzzer responsive to both said third and fourth electrical signals and said fifth and sixth electrical signals so that the lamp is illuminated and the buzzer is energized in response to said third and fourth electrical signals and said buzzer only is energized in response to said fifth and sixth electrical signals.

10. In the sequencing safety belt warning and start inhibit system according to claim 1 additionally including a plurality of filter means each of which is electrically connected with a corresponding one of each of said safety belt switch means and said seat switch means, each said filter means comprising a resistor and a capacitor electrically connected in series between a source of voltage and ground and the junction of each said resistor and capacitor pair being connected to the corresponding one of said safety belt switch means and of said seat switch means for electrically suppressing voltage transients due to actuation of the corresponding one of said safety belt switch means and of said seat switch means.

11. In the sequencing safety belt warning and start inhibit system according to claim 10 wherein the capacity of said filter means electrically connected to each of said seat switch means is greater than the capacity of the filter means electrically connected to the corresponding safety belt switch means.

12. In the sequencing safety belt warning and start inhibit system according to claim 1 wherein the vehicle includes a battery and additionally including current-saver means electrically responsive to said ignition key switch means for supplying a regulated voltage which is lower than the battery voltage to the system when said ignition key switch means is actuated and for suppressing voltage transients which are greater than the battery voltage when said ignition key switch means is non-actuated.

13. In the sequencing safety belt warning and start inhibit system according to claim 1 wherein one of said predetermined occupant positions is for the operator of the vehicle and additionally including means requiring occupancy of said one occupant position for enabling the start of the engine.

14. In a motor vehicle having an engine, transmission, occupant seating means and safety belt at each of a predetermined number of occupant positions of said seating means, a sequencing safety belt alarm system for alarming the occupants of the vehicle whenever the safety belt conditions at each of the predetermined occupant positions are not satisfied, said system comprising:
safety belt switch means operatively associated with the safety belt at each one of the predetermined occupant positions for generating and maintaining a first electrical signal registering utilization of the safety belt;
seat switch means at each one of the predetermined occupant positions for generating and maintaining a second electrical signal registering the presence of an occupant occupying the corresponding position;
sequence logic means electrically connected in circuit for receiving said first and second electrical signals generated by said safety belt switch means and said seat switch means at each predetermined occupant position, said sequence logic means including means for detecting the sequence of generation of said first and second electrical signals at each predetermined occupant position for generating a third electrical signal whenever the second signal alone is generated at any of said predetermined occupant positions and whenever generation of the first signal precedes the generation of the second signal at any of said predetermined occupant positions;
transmission switch means responsive to the engagement of the transmission of the vehicle for generating a fourth electrical signal;
ignition key switch means responsive to an attempt to start the vehicle for generating a fifth electrical signal; and
an alarm means responsive to said third signal from said sequence logic means and to said fourth signal from said transmission switch means for alarming a vehicle occupant and also responsive to said third signal from said sequence logic means and to said fifth signal from said ignition key switch means for alarming a vehicle occupant.

15. In a motor vehicle having an engine, transmission, occupant seating means and a safety belt at each of a predetermined number of occupant positions of said seating means, a sequencing safety belt alarm system for alarming the occupants of the vehicle whenever the safety belt conditions at each of the predetermined occupant positions are not satisfied, said system comprising:
safety belt switch means operatively associated with the safety belt at each one of the predetermined occupant positions for generating and maintaining a first electrical signal registering utilization of the safety belt;
seat switch means at each one of the predetermined occupant positions for generating and maintaining a second electrical signal registering the presence of an occupant occupying the corresponding position;
sequence logic means electrically connected in circuit for receiving said first and second electrical signals generated by said safety belt switch means and said seat switch means at each predetermined occupant position, said sequence logic means including means for detecting the sequence of generating of said first and second electrical signals at each predetermined occupant position for generating a third electrical signal whenever the second signal alone is generated at any of said predetermined occupant positions and whenever generation of the first signal precedes the generation of the second signal at any of said predetermined occupant positions;
door switch means responsive to the opening of a vehicle door for generating a fourth electrical signal;
ignition key switch means responsive to an attempt to start the vehicle for generating a fifth electrical signal; and
ignition key sensing switch means responsive to a key in said ignition key switch means for providing a sixth electrical signal, and
an alarm means comprising a lamp responsive to said third and fifth electrical signals and a buzzer responsive to both said third and fifth electrical signals and to said fourth and sixth electrical signals, whereby the lamp is illuminated and the buzzer is energized in response to said third and fifth electrical signals and only said buzzer is energized in response to said fourth and sixth electrical signals.

16. In the sequencing safety belt warning and start inhibit system according to claim 1 wherein said vehicle has a plurality of doors and additionally including:

door switch means responsive to the closing of all the doors of said vehicle for generating a fifth electrical signal;

a logic gate means having two inputs and an output wherein one of said inputs is electrically connected to receive said fifth electrical signal, the other of said inputs is electrically coupled to receive a sixth electrical signal representing actuation of a selected safety belt switch means subsequent to actuation of the corresponding seat switch means and said gate generating at its output a seventh electrical signal when said fifth and sixth electrical signals are coincident; and clamping means electrically connected between said seat switch means and the output of said logic gate for maintaining said second electrical signal at the logic level of said seventh electrical signal independently of said seat switch means.

17. In the sequencing safety belt warning alarm system according to claim 18 wherein the capacity of each of said filter means electrically connected to each of said seat switch means is greater than the capacity electrically connected to said safety belt switch means.

* * * * *